United States Patent
Fukuma

[11] Patent Number: 6,065,449
[45] Date of Patent: May 23, 2000

[54] FUEL INJECTION CONTROL DEVICE FOR AN INTERNAL COMBUSTION ENGINE

[75] Inventor: Takao Fukuma, Numazu, Japan

[73] Assignee: Toyota Jidosha Kabushiki Kaisha, Toyota, Japan

[21] Appl. No.: 09/210,768

[22] Filed: Dec. 14, 1998

[30] Foreign Application Priority Data

Dec. 17, 1997 [JP] Japan ..................................... 9-348243

[51] Int. Cl.[7] .............................. F02D 41/04; F02D 41/40
[52] U.S. Cl. ............................................ 123/436; 123/357
[58] Field of Search .............................. 123/357, 406.24, 123/406.25, 436; 701/110, 111

[56] References Cited

U.S. PATENT DOCUMENTS 5,669,354 9/1997 Morris ................................. 123/436 X

FOREIGN PATENT DOCUMENTS

| | | |
|---|---|---|
| 447697 | 9/1991 | European Pat. Off. . |
| 60-26142 | 2/1985 | Japan . |
| 60-233354 | 11/1985 | Japan . |
| 62-126246 | 6/1987 | Japan . |
| 62-126247 | 6/1987 | Japan . |

*Primary Examiner*—Tony M. Argenbright
*Attorney, Agent, or Firm*—Oliff & Berridge, PLC

[57] ABSTRACT

The fuel injection control device includes an electronic control unit (ECU) for controlling a fuel injection amount of the diesel engine of an automobile. The ECU determines a basic fuel injection amount in accordance with the engine operating condition such as the amount of depression of the accelerator pedal, the intake air amount and the engine speed. Further, the ECU estimates the magnitude of the torsional vibration of the output shaft system of the engine when the basic fuel injection amount of fuel is supplied to the engine using a model of the output shaft system. The ECU performs a feedforward control based on the estimated magnitude of the torsional vibration and corrects the basic fuel injection amount so that the torsional vibration becomes small. Therefore, the fuel injection amount is corrected to attenuate the torsional vibration before the torsional vibration actually occurs.

7 Claims, 9 Drawing Sheets

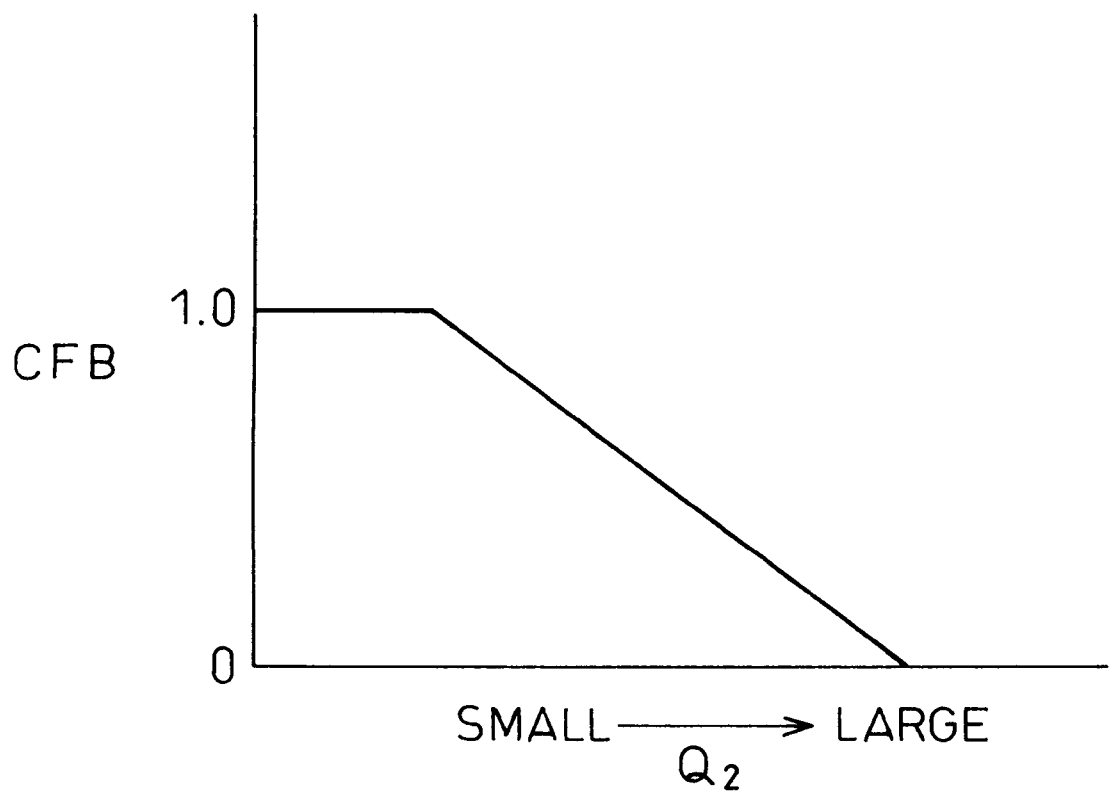

FUEL INJECTION CONTROL DEVICE FOR AN INTERNAL COMBUSTION ENGINE

BACKGROUND OF THE INVENTION

1. Field of the Invention

The present invention relates to a fuel injection control device for an internal combustion engine. More specifically, the invention relates to a fuel injection control device which is capable of attenuating the torsional vibration of the output shaft system of an internal combustion engine.

2. Description of the Related Art

A torsional vibration occurring in the output shaft system of an internal combustion engine causes various problems. Especially, in the engine for an automobile, the torsional vibration of the output shaft system causes a surge during a steady running as well as an acceleration shock during an acceleration of the vehicle and worsens the driveability of the vehicle. Further, in a diesel engine, since the fuel injection amount is determined in accordance with the operating condition of the engine (such as the engine speed and the amount of depression of the accelerator pedal by the driver), the determined fuel injection amount immediately changes when the amount of depression of the accelerator pedal (hereinafter referred to as the "accelerator depression" changes.

Therefore, if the amount of fuel determined by the accelerator depression is injected into the engine without correction, the torsional vibration of the output shaft system increases due to a sudden change in the output torque of the engine. Therefore, in order to prevent the increase in the torsional vibration, a so-called smoothing control of the fuel injection amount is performed to increase the actual fuel injection amount gradually even though the fuel injection amount determined by the accelerator depression suddenly increases during, for example, an acceleration of the vehicle.

Further, a method for attenuating torsional vibration by detecting the actual torsional vibration of the output shaft system of the engine and by controlling the engine output torque so that the detected vibration is attenuated is known in the art.

The example of a vibration attenuating device using this method is disclosed, for example, in Japanese Unexamined Patent Publication (Kokai) No. 60-26142.

The device in the '142 publication detects a physical amount relating to the torsional vibration such as a change in the rotating speed of a diesel engine, a change in the acceleration of the vehicle on which the engine is installed and a change in the torsional torque exerted on the output shaft of the engine and uses the value as parameters representing the characteristics of the torsional vibration of the engine output shaft system. The device in the '142 publication attenuates the torsional vibration by adjusting the amount of fuel injected into the engine by a feedback control based on a rate of change in the value of the parameter.

Theoretically, the device in the '142 publication can attenuate the torsional vibration of the output shaft system efficiently since it performs the feedback control of the actual fuel injection amount of the engine based on the actual torsional vibration. However, since the device performs the control based on the torsional vibration which has already occurred in the shaft system, the device cannot prevent the torsional vibration before it occurs. Therefore, device in the '142 publication cannot prevent a large torsional vibration occurs at the beginning of the transient condition such as the beginning of the acceleration of the vehicle.

A feedforward control can be also used for attenuating the torsional vibration. In feedforward control, for example, correction amounts for the fuel injection required for attenuating the torsional vibration are previously determined by experiments based on various combinations of the engine operating conditions and fuel injection amount calculated based on the engine operating conditions. The correction amounts obtained by experiment are stored in a memory of a control device and, during the operation of the engine, the correction amount of the fuel injection is read from the memory in accordance with the engine operating conditions and the calculated fuel injection amount. By correcting the calculated fuel injection amount using the correction amount determined by the feedforward control, the calculated fuel injection amount can be corrected before the actual torsional vibration occurs. Therefore, the torsional vibration does not occur even in the transient operating conditions. However, in order to perform an accurate feedforward control, it is necessary to determine the correction amounts based on every combination of the operating condition and calculated fuel injection amount for each type of the engine. Since this requires a large number of experiments, heretofore, it was difficult to apply feedforward control for accurately attenuating the torsional vibration.

Further, even if a feedforward control is applied, it is preferable to use the feedback control to compensate for the variation in the characteristics of the elements in the output shaft system and changes in the characteristics due to the accumulated operation time. If the feedback control is performed together with the feedforward control, however, the attenuation capability of the control sometimes deteriorates due to interference between the feedback control and the feedforward control.

SUMMARY OF THE INVENTION

In view of the problems in the related art as set forth above, the object of the present invention is to provide means for accurately attenuating the torsional vibration of the output shaft system by applying a feedforward control for attenuation together with a feedback control without requiring a large number of experiments and without causing interference between the feedforward control and the feedback control.

The object as set forth above is achieved by a fuel injection control device for an internal combustion engine comprising basic fuel injection amount setting means for setting a basic fuel injection amount of an engine in accordance with the operating condition of the engine and correcting means for setting an actual fuel injection amount of the engine by correcting the basic fuel injection amount, wherein the correcting means estimates a torsional vibration of the output shaft system of the engine caused by the subsequent fuel injection based on the basic fuel injection amount and sets the actual fuel injection amount in accordance with the estimated torsional vibration in such a manner that the torsional vibration of the output shaft system is attenuated.

According to the present invention, the amplitude of the torsional vibration when the next fuel injection is performed is estimated, and the actual fuel injection amount is corrected in order to attenuate the vibration, i.e., the correction of the fuel injection amount is done before the torsional vibration actually occurs. Therefore, the torsional vibration can be accurately attenuated.

BRIEF DESCRIPTION OF THE DRAWINGS

The present invention will be better understood from the description, as set forth hereinafter, with reference to the accompanying drawings in which:

FIG. 11 is a diagram showing the value of a coefficient used in the calculation in FIG. 10.

DESCRIPTION OF THE PREFERRED EMBODIMENT

Hereinafter, an embodiment of the fuel injection control device according to the present invention will be explained with reference to FIGS. 1 through 11.

Figure 1:
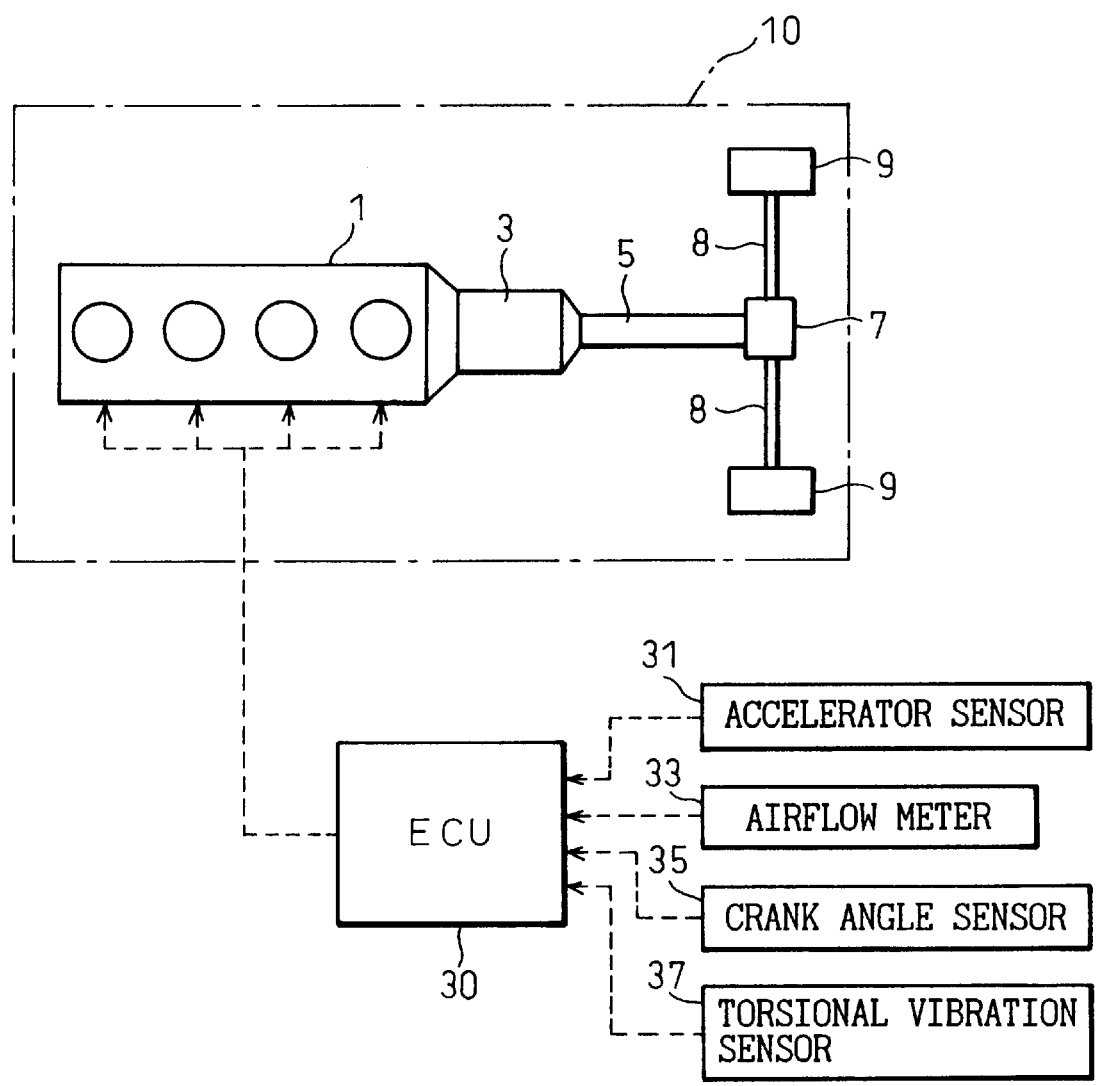
FIG. 1 is shows the general configuration of an embodiment of the present invention when it is applied to a diesel engine for an automobile.

FIG. 1 schematically shows the general configuration of an embodiment of the fuel injection control device when the present invention is applied to a diesel engine for automobile.

In FIG. 1, reference numeral 10 designates an automobile (a vehicle) as a whole and numeral 1 designates a diesel engine which is installed on the vehicle 10 (in this embodiment, a four-cylinder four-cycle diesel engine is used). An output shaft (not shown) of the engine 1 is connected to a gearbox 3 and drives wheels 9 through a propeller shaft 5, a differential gear 7 and axles 8. In this specification, a shaft system including from a crankshaft of the engine 1 to wheels 9 is referred to as "an output shaft system" of the engine 1.

In FIG. 1, numeral 30 designates an electronic control unit (ECU) 30 for controlling the engine 1. The ECU 30 in this embodiment may consist of a microcomputer of a known type which includes RAM, ROM, CPU and input/output ports all connected to each other by a bi-directional bus. The ECU 30 performs basic controls of the engine 1 such as a fuel injection control. As explained later, the ECU 30 in this embodiment further performs an attenuation control of the torsional vibration of the output shaft system by correcting the fuel injection amount.

In order to perform these controls, the input port of the ECU 30 is connected to an accelerator sensor 31, an airflow meter 33 and a torsional vibration sensor 37 via an AD converter (not shown). The input port of the ECU 30 is further connected to a crank angle sensor 35.

The accelerator sensor 31 is disposed near an accelerator pedal (not shown) of the engine 1 and which generates a voltage signal corresponding to the amount of depression ACCP (the accelerator depression) by the driver of the vehicle 10. The accelerator depression ACCP is used as a parameter representing an engine output required by the driver in this embodiment.

The airflow meter 33 is disposed in the intake air passage (not shown) of the engine 1 and which generates a voltage signal corresponding to the intake air amount G drawn into the engine. The intake air amount G, together with the accelerator depression ACCP, is used for calculating a basic fuel injection amount of the engine 1, as explained later.

The crank angle sensor 35 is actually composed of two sensors. One is a reference position sensor (not shown) which is disposed near a camshaft of the engine 1 and which generates a reference pulse signal when the crankshaft reaches a reference rotating position (for example, when the first cylinder of the engine 1 reaches the top dead center of the compression stroke). Namely, the reference position sensor generates a reference pulse signal every 720 degrees rotation of the crankshaft. Another is a rotation angle sensor (not shown) disposed near the crankshaft of the engine 1 and which generates a rotating pulse signal at a predetermined angle of rotation (for example, at every 15 degrees rotation) of the crankshaft.

In this embodiment, the ECU 30 calculates the rotating speed NE of the engine 1 based on the intervals of the rotation pulse signal. The ECU 30 determines the present rotating position (the crank angle) of the crankshaft based on the number of the rotating pulses generated after receiving the reference pulse signal.

The torsional vibration sensor 37 is a sensor capable of detecting physical amounts representing the torsional vibration of the output shaft system. For example, the torsional vibration occurring in the output shaft system of the engine causes a change in the acceleration of the vehicle. Therefore, an acceleration sensor which detects the acceleration exerted on the vehicle may be used for the torsional vibration sensor 37. In this case, the change in the acceleration of the vehicle is used as a parameter representing the torsional vibration of the output shaft system. Further, the torsional vibration of the output shaft system causes a change in the rotating speed of the crankshaft. Therefore, instead of providing a separate torsional vibration sensor, the crank angle sensor 35 may be used also as a torsional vibration sensor. In this case, a rate of change in the engine rotating speed NE detected by the crank angle sensor 35, i.e., an acceleration, is used as a parameter representing the torsional vibration of the output shaft system. Further, the torsional vibration of the output shaft system causes a change in the torsional torque of the engine output shaft. Therefore, torque sensor which detects the torsional torque of the output shaft of the engine 1 may be used for the torsional vibration sensor 37. In this case, the change in the torsional torque detected by the torque sensor is used as a parameter representing the torsional vibration of the output shaft system.

In this embodiment, the rate of change in the engine rotating speed NE detected by the crank angle sensor 35 is used as the parameter representing the torsional vibration of the output shaft system.

As explained later, the ECU 30 calculates the basic fuel injection amount $Q_1$ based on the operating condition of the engine such as the engine rotating speed NE, the intake air amount G and the accelerator depression ACCP. Further, the ECU 30 calculates the correction amount $Q_2$ of the fuel injection amount based on a standardized model of the output shaft system in order to attenuate the torsional vibration. The ECU 30 further calculates a second correction amount $Q_3$ of the fuel injection amount in accordance with the amplitude of the actual torsional vibration detected by the torsional vibration sensor 37 in order to attenuate the torsional vibration. The calculations of $Q_1$, $Q_2$ and $Q_3$ are explained later in detail.

The output port of the ECU 30 is connected to fuel injection valves of the respective cylinders of the engine 1 via a fuel injection circuit (not shown) in order to inject fuel of the amount determined by $Q_1$, $Q_2$ and $Q_3$ into the cylinders at predetermined fuel injection timing.

Next, the control for attenuating the torsional vibration in this embodiment will be explained.

Figure 2:
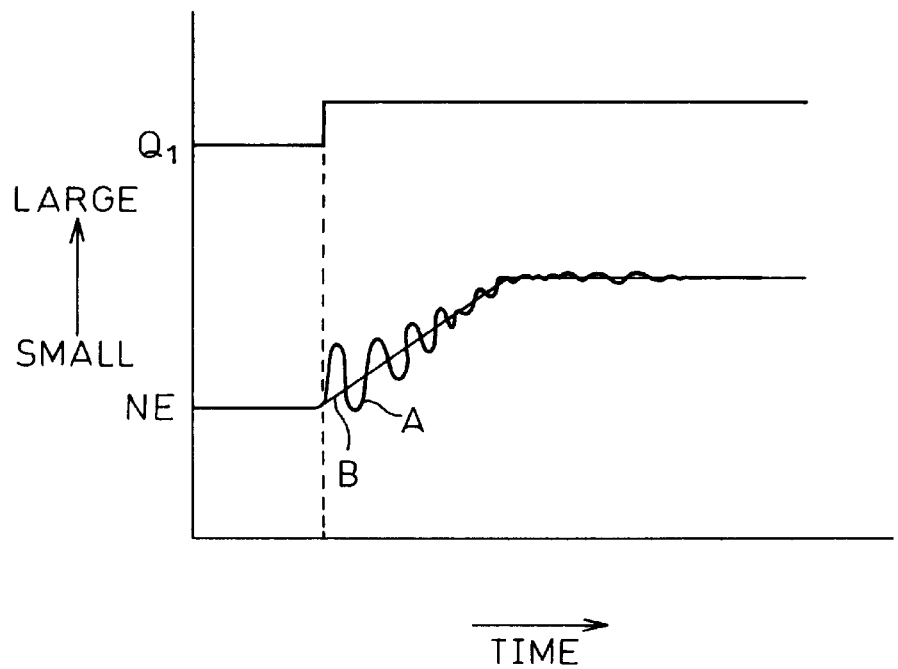
FIG. 2 schematically illustrates the torsional vibration occurring in the output shaft system of the engine.

FIG. 2 is a diagram illustrating the change in the engine speed NE when the basic fuel injection amount $Q_1$ suddenly increases during the acceleration of the engine. If a torsional vibration does not occur during the acceleration, the engine speed NE increases uniformly as indicated by the curve B in FIG. 2 even though the fuel injection amount $Q_1$ suddenly increases. However, in the actual operation, since the sudden increase in the output torque of the engine due to the increase in the fuel injection amount $Q_1$ causes a torsional vibration in the output shaft system, fluctuation of the engine speed due to the torsional vibration is imposed on the uniform increase in the engine speed. Thus, the actual engine speed NE increases in the manner indicated by the curve A in FIG. 2. The fluctuation components of the engine speed has a frequency the same as the torsional resonance frequency of the output shaft system (usually, several kHz frequency in an automobile output shaft system) and the amplitude thereof decreases with time. Though FIG. 2 illustrates the torsional vibration occurs during the acceleration, a similar torsional vibration occurs also during a deceleration of the vehicle. The fluctuation of the engine speed due to the torsional vibration causes the fluctuation of the acceleration of the vehicle and deteriorates the driveablity of the vehicle.

In this embodiment, the torsional vibration is attenuated by correcting the fuel injection amount, as explained below, so that the engine speed changes smoothly, for example, in the manner shown by the curve B in FIG. 2 in the actual operation.

In order to accurately attenuate the torsional vibration in the output shaft system, it is too late to correct the fuel injection amount after the torsional vibration has actually occurred since a delay in the control always exists.

In this embodiment, therefore, the magnitude of the torsional vibration caused by the next fuel injection is estimated before the fuel injection is actually performed and the amount of the next fuel injection is corrected in such a manner that the magnitude of the torsional vibration when the next fuel injection is performed becomes the minimum. Namely, a feedforward control of the fuel injection amount based on the estimated magnitude of the torsional vibration when the fuel is next injected is performed.

The torsional vibration when the next fuel injection is performed is estimated by a transfer function (the ratio between the Laplace transform of the output and the Laplace transform of the input) determine in a model of the output shaft system of the engine. Namely, in this embodiment, a standardized model of the output shaft system is prepared for the respective type of engine and a transfer function which matches the model is prepared. In this embodiment, the transfer function is set in such a manner that the input thereof is a fuel injection amount and the output thereof is a physical amount relating to the magnitude of the torsional vibration. Hereinafter, the physical amount relating to the magnitude of the torsional vibration is referred to as "the torsional vibration parameter" and, for example, the changes in the engine speed NE, the acceleration of the vehicle or the torsional torque of the engine output shaft may be used as a torsional vibration parameter. By estimating the future torsional vibration using the transfer function based on the standardized model of the output shaft system, the feedforward control can be applied to the attenuation control of the torsional vibration without requiring a large number of experiments.

Figure 3:
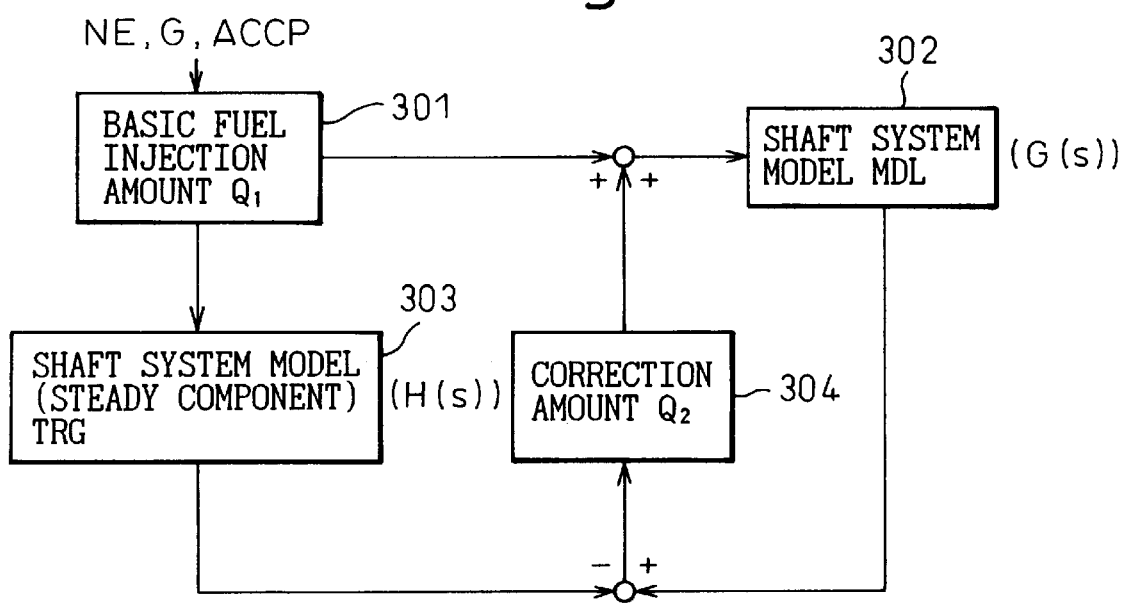
FIG. 3 is a block diagram illustrating a general concept of the attenuation method of the torsional vibration using a feedforward control.

FIG. 3 is a block diagram illustrating the basic concept of the fuel injection amount correcting operation based on the feedforward control.

In FIG. 3, the block 301 represents the operation for the basic fuel injection amount $Q_1$. In this embodiment, the basic fuel injection amount $Q_1$ is set at a target fuel injection amount $Q_{GOV}$ or a smoke limit fuel injection amount $Q_{FULL}$ whichever is smaller (i.e., $Q_1 = \text{MIN}(Q_{GOV}, Q_{FULL})$). $Q_{GOV}$ is a fuel injection amount corresponding to the engine output required by the driver and calculated by a function using the engine speed NE and the accelerator depression ACCP. $Q_{FULL}$ is the maximum fuel amount which can be injected into a cylinder without generating an exhaust smoke and is calculated by a function based on the intake air amount G and the engine speed NE. The calculated value of $Q_1$ is added to a correction amount $Q_2$ of the fuel injection, and the total value of $(Q_1+Q_2)$ is supplied to the block 302 where the value MDL of the torsional vibration parameter when the amount $(Q_1+Q_2)$ of fuel is injected is calculated by the transfer function G(s). MDL corresponds to the magnitude of the torsional vibration when the amount $(Q_1+Q_2)$ of fuel is injected to the engine. The transfer function G(s) is, as explained before, determined in accordance with the model of the output shaft system in FIG. 4.

Further, the calculated value of the basic fuel injection amount $Q_1$ is also fed to the block 303 where a steady value TRG of the torsional vibration parameter is calculated by the transfer function H(s). H(s) is a steady component of the transfer function G(s) and obtained from G(s) by eliminating the fluctuation components from G(s). Therefore, the value TRG obtained by the block 303 corresponds to a steady change in the engine speed when the amount $Q_1$ of the fuel is injected into the engine (i.e., the change in the engine speed when the torsional vibration does not exist, for example, the change in the speed indicated by the curve B in FIG. 2).

The correction amount $Q_2$ is obtained as a function based on the difference between the values TRG and MDL calculated in the blocks 303 and 302. In this embodiment, the correction amount $Q_2$ is set at a value proportional to the difference between the values TRG and MDL, i.e., $Q_2 = K \times (TRG-MDL)$ (K is a constant determined by experiment). The calculated value $Q_2$ is used for the next calculation of MDL in the block 302. As can be seen from the block diagram in FIG. 3, the correction amount $Q_2$ is set at a value which makes MDL approach TRG. Therefore, when the amount $(Q_1+Q_2)$ of fuel is next injected into the engine, the value of the torsional vibration parameter approaches to the steady value TRG, i.e., the torsional vibration of the output shaft system is attenuated. Further, when a sufficient time has elapsed after the basic fuel injection amount $Q_1$ changed, since the value MDL agrees with the value TRG, the correction amount $Q_2$ becomes zero.

Next, the transfer function G(s) derived from the model of the output shaft system and the transfer function H(s), which is the steady component of the transfer function G(s), will be explained.

Figure 4:
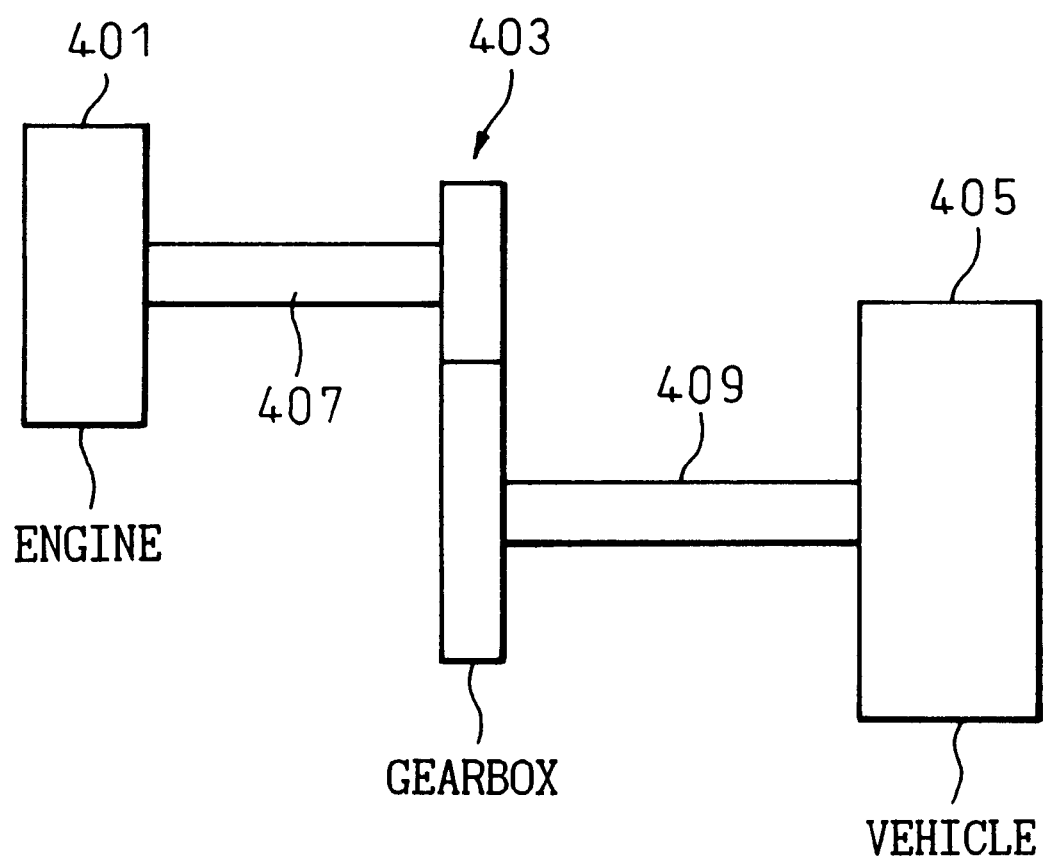
FIG. 4 shows an example of a torsional vibration model of the output shaft system.

FIG. 4 schematically shows an example of a standardized model of the output shaft system of the engine used for determining the transfer function G(s). In FIG. 4, numerals 401, 403 and 405 represent the moments of inertia corresponding to the engine 1, the gearbox 3 and the vehicle 10, respectively. Numerals 407 represents a shaft equivalent to the shaft system from the engine to the gearbox 3, 409 is a shaft equivalent to the shaft system from the gearbox 3 to the wheels 9. Since the torsional spring coefficients of the shaft systems and the moments of inertia change as the gear ratio of the gearbox changes, different output shaft system models are required for the respective gear stages of the gearbox 3. Therefore, the model in FIG. 4 and the transfer functions G(s) and H(s) are prepared for each gear stage and the transfer functions corresponding to the present gear shift position is used for calculating the correction amount $Q_2$ in the actual operation. However, in order to simplify the explanation, the case where the gear stage is fixed will be explained hereinafter.

When the output shaft system model in FIG. 4 is used, and the fuel injection amount (the engine output torque) and the torsional vibration parameter (for example, the rate of change in the engine speed) are used for the input and the output of the transfer function, respectively, the transfer function G(s) is expressed as follows.

$$G(s) = (\gamma \times s + \delta)/(s^2 + \alpha \times s + \beta) \quad (1)$$

Further, the transfer function H(s) obtained by eliminating the fluctuation component from G(s) is expressed as follows.

$$H(s) = (\delta/\beta) \quad (2)$$

$\alpha$, $\beta$, $\gamma$ and $\delta$ in the above functions are constants determined by the characteristic values of the output shaft system (such as the moments of inertia and the torsional spring coefficients).

The values of the torsional vibration parameters MDL and TRG are, therefore, calculated by $$MDL = (Q_1 + Q_2) \times G(s) \quad (3)$$

and $$TRG = Q_1 \times H(s) = KG \times Q_1 \quad (4)$$

$(KG = \delta/\beta)$

In this embodiment, the transfer function G(s) in the form of (1), i.e., in the form of a continuous function, is converted into the following discrete function to facilitate the processing by the ECU 30.

$$X_{(n+1)} = A \times X_{(n)} + B \times U(Q_1 + Q_2) \quad (5)$$

and $$MDL = C \times X_{(n)} \quad (6)$$

$U(Q_1 + Q_2)$ in the function (5) represents a function of $(Q_1 + Q_2)$. In this embodiment, $X_{(n)}$ is calculated from the actual fuel injection amount $(Q_1 + Q_2)$ by a sequential calculation using the function (5), and the value MDL of the torsional vibration parameter is calculated from the value of $X_{(n)}$ using the function (6). The value TRG is calculated from the basic fuel injection amount $Q_1$ using the function (4). $X_{(n)}$ is a function used for converting the continuous function (1) into a discrete function and need not correspond to a physical amount. Further, A, B and C are constants.

Next, the actual calculation of the correction amount of the fuel injection amount for attenuating the torsional vibration using the above-explained discrete transfer functions will be explained with reference to FIGS. 5 through 10.

Figure 5:
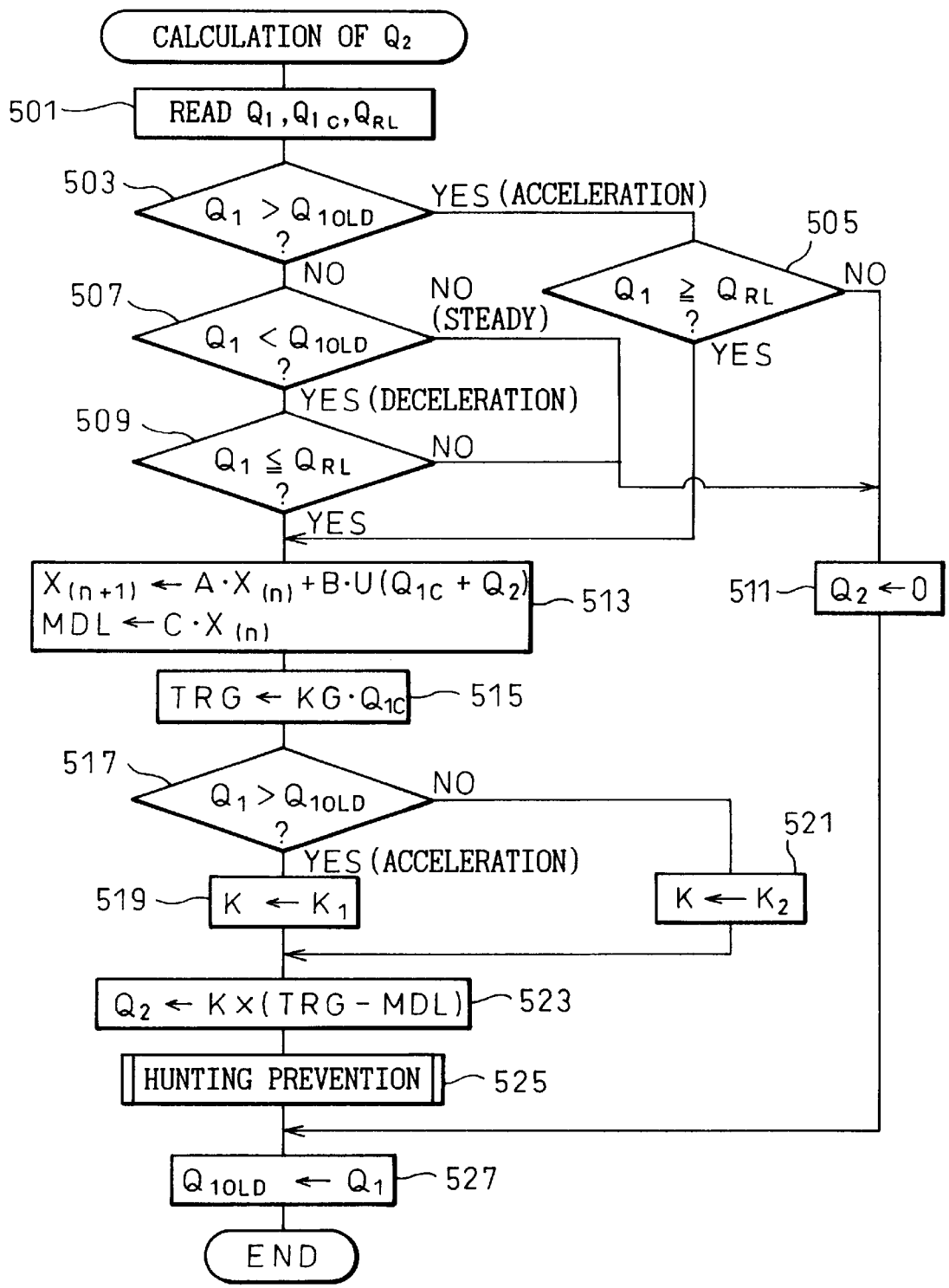
FIG. 5 is a flowchart illustrating an example of the calculation of the correction amount of the fuel injection based on a feedforward control.

FIG. 5 is a flowchart illustrating the calculation of the correction amount $Q_2$ for attenuating the torsional vibration. This calculation is performed by a routine executed by the ECU 30 at regular intervals.

In FIG. 5, at step 501, the basic fuel injection amount $Q_1$, a reference fuel injection amount $Q_{1c}$ and a zero-torque fuel injection amount $Q_{RL}$ are read in. $Q_1$, $Q_{1c}$, and $Q_{RL}$ are calculated by the operation in FIG. 6 explained later at predetermined crank angles. $Q_1$ is the basic fuel injection amount calculated using the values of the engine operating condition parameters (the engine speed NE, the intake air amount G and the accelerator depression ACCP) at a predetermined fuel injection amount calculation timing. $Q_{1c}$ is the reference fuel injection amount which is calculated in a manner the same as the basic fuel injection amount, except that $Q_{1c}$ is calculated using the values of the engine operating condition parameters (NE, G, ACCP) at the time when the output torque is actually generated in the cylinders of the engine. The reference fuel injection amount $Q_{1c}$ is used only for the calculation of MDL and TRG at steps 513 and 514. By calculating the values of MDL and TRG using the reference fuel injection amount calculated in accordance with the operating condition when the output torque is actually generated, the accuracy of the estimation of MDL and TRG is improved.

The zero-torque fuel injection amount $Q_{RL}$ is a fuel injection amount which makes the output torque of the engine plus and minus zero at the present engine speed, i.e., the torque transferred by the output shaft system becomes zero. $Q_{RL}$ is calculated at a timing the same as that of $Q_1$ by the calculation in FIG. 6. The calculation in FIG. 6 will be explained later.

In FIG. 5, at steps 503 through 509, it is determined whether the calculation of $Q_2$ should be started. In this embodiment, the calculation of $Q_2$ is started when the basic fuel injection amount $Q_1$ increases to the zero-torque fuel injection amount $Q_{RL}$ during acceleration (i.e., when $Q_{1c}$ is increasing) or $Q_1$ decreases to $Q_{RL}$ during deceleration (when $Q_1$ is decreasing). The reason why the calculation of the correction amount $Q_2$ is commenced when the basic fuel injection amount $Q_1$ crosses the zero-torque fuel injection amount $Q_{RL}$ is that the torsional torque of the output shaft system before the value $Q_2$ crosses $Q_{RL}$ is decreasing. Namely, when $Q_1 = Q_{RL}$, the torsional torque exerted on the output shaft system becomes zero and the torsion angle of the output shaft system becomes zero. During the acceleration, the torsional torque transferred from the engine to the output shaft system increases. Therefore, if $Q_1$ is smaller than $Q_{RL}$ during the acceleration, it means that the torsion angle of the output shaft system is negative (i.e., torque is exerted from the output shaft system to the engine) and approaches to zero. Since the amount of torsion of the output shaft system is decreasing in this condition, the torsional torque which excites the torsional vibration is also decreasing and the magnitude thereof is small. It is also true when $Q_1 > Q_{RL}$ during the deceleration. Since the exciting torque causing the torsional vibration starts to increase after $Q_1$ crosses $Q_{RL}$, the torsional vibration can be effectively attenuated by starting the correction of the fuel injection amount when the value of $Q_1$ crosses the value of $Q_{RL}$ during the acceleration and the deceleration.

In order to determine whether the correction of the fuel injection amount is required, the operation in FIG. 5 determines whether the acceleration or deceleration is currently performed at steps 503 and 507. Namely, at steps 503 and 507, it is determined that the acceleration is currently performed if the basic fuel injection amount $Q_1$ read at step 501 is larger than the basic fuel injection amount $Q_{1OLD}$ when the operation in FIG. 5 is last performed. Similarly, at step 507, it is determined that the deceleration is currently performed if $Q_1$ is smaller than $Q_{1OLD}$. If it is determined that the acceleration is performed at step 503, the operation determines whether the correction of the fuel injection amount should be started at step 505 by comparing $Q_1$ with $Q_{RL}$ and, if $Q_1 < Q_{RL}$ at step 505, since it is not necessary to start the correction, the correction amount $Q_2$ is set to 0 at step 511. Similarly, if it is determined that the deceleration is currently performed at step 507, the operation determines whether the correction of the fuel injection amount should be started at step 509 by comparing $Q_1$ with $Q_{RL}$. If $Q_1 > Q_{RL}$ at step 509, since it is not necessary to start the correction, $Q_2$ is set to 0 at step 511. Further, if neither the acceleration nor the deceleration is currently performed, i.e., if $Q_1 = Q_{1OLD}$, since a steady operation is currently performed, $Q_2$ is also set to 0 at step 511. When $Q_2$ is set to 0 at step 511, the operation in FIG. 5 terminates after renewing the value of $Q_{1OLD}$ at step 527.

If $Q_1 \geq Q_{RL}$ at step 505 or it $Q_1 \geq Q_{RL}$ at step 509, the calculation of the correction amount $Q_2$ is performed at steps 513 through 515.

Namely, at step 513, the value MDL of the torsional vibration parameter is calculated based on the functions (5) and (6) explained before. As explained before, the reference fuel injection amount $Q_{1c}$ based on the engine operating condition when the output torque is actually generated and the correction amount $Q_2$ calculated when the operation in FIG. 5 was last performed are used in the calculation of MDL at step 513. Further, at step 515, the value TRG of the steady component of the torsional vibration parameter is calculated from the function (4) using $Q_{1c}$.

The correction amount $Q_2$ is given as a function of the difference between TRG and MDL and, in this embodiment, $Q_2$ is calculated by $Q_2 = K \times (TRG - MDL)$ (step 523) using a constant K.

Further, in this embodiment, different functions of (TRG−MDL) are used in accordance with whether the engine is accelerated ($Q_1 > Q_{1OLD}$) or decelerated ($Q_1 < Q_{1OLD}$) Namely, at step 517 the operation again determines whether $Q_1$ is larger than $Q_{1OLD}$ and, if $Q_1 > Q_{1OLD}$ (accelerating), the value of the constant K is set to $K_1$ at step 519. If the acceleration is no being performed currently (i.e., if the deceleration is being performed), the value of the constant K is set to $K_2$ at step 521. $K_1$ and $K_2$ are constants having a relationship $K_1 > K_2 > 0$. By setting the value of K in the manner explained above, the value $Q_2$ during the acceleration becomes larger than the value $Q_1$ during the deceleration. During the acceleration, since the torsional torque transferred by the output shaft system increases, the torsion angle of the shaft system also increases. Therefore, the required torque for reducing the torsion angle (i.e., for attenuating the torsional vibration) becomes larger during the acceleration compared to that during the deceleration. In this embodiment, since the correction amount $Q_2$ (i.e., torque for attenuating the torsional vibration) is set at a larger value during the acceleration compared to that during the deceleration, the torsional vibration can be effectively attenuated also during the acceleration.

After calculating $Q_2$ at step 521, the operation determines if hunting is expected and, it hunting is expected, corrects the calculated value $Q_2$ at step 525. The operation carried out at step 525 will be explained later using FIG. 8.

Next, the calculations of the basic fuel injection amount $Q_1$, the reference fuel injection amount $Q_{1c}$ and the zero-torque fuel injection amount $Q_{RL}$ will be explained with reference to FIG. 6. The operation in FIG. 6 is performed by a routine executed by the ECU 30 at predetermined crank angles.

Figure 6:
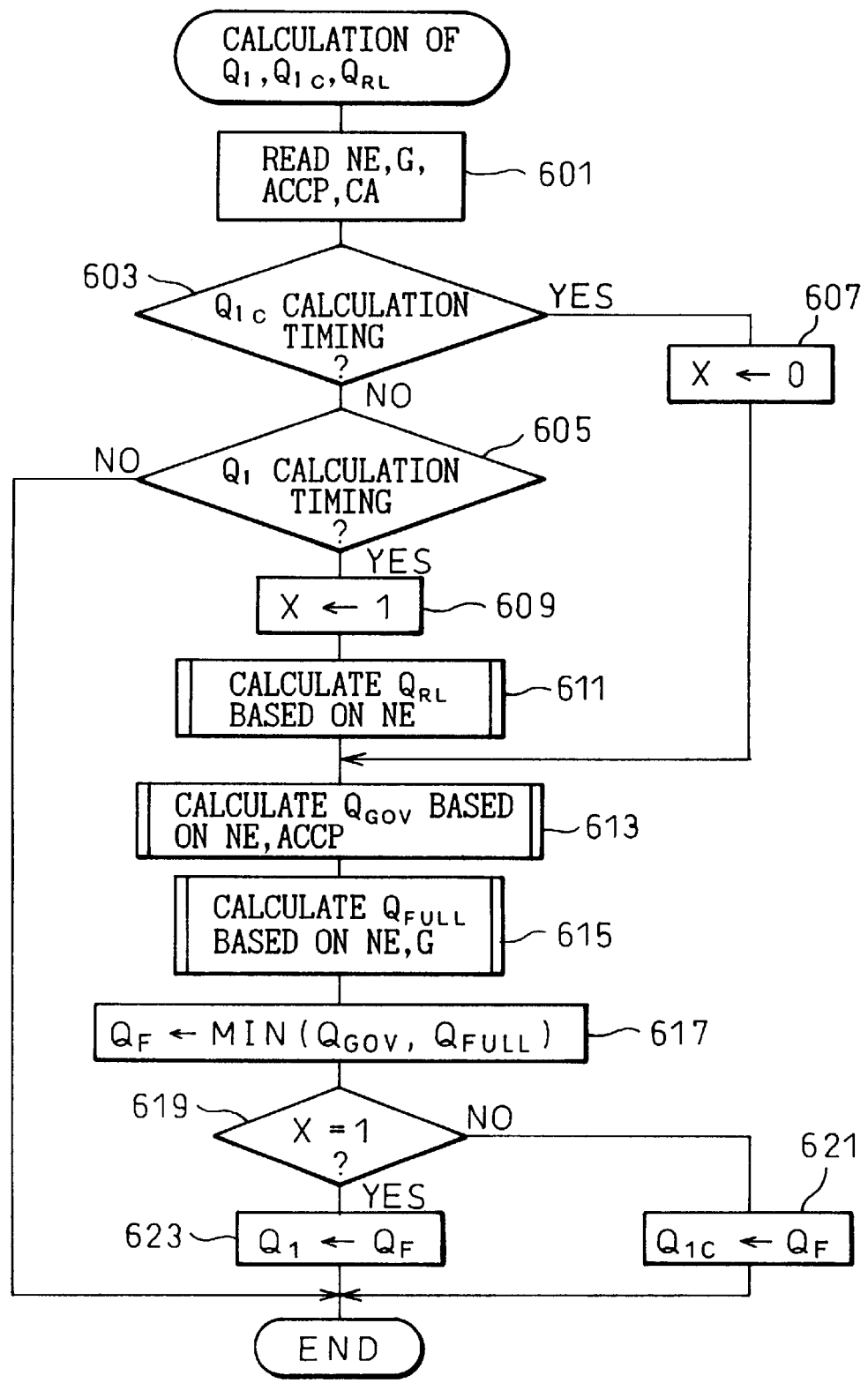
FIG. 6 is a flowchart illustrating an example of the calculation of various fuel injection amounts used in the calculation in FIG. 5.

In FIG. 6, at step 601, the engine speed NE, the intake air amount G, the accelerator depression ACCP and the current crank rotation angle CA are read in. At step 603 and 605, it is determined whether the current crank angle CA corresponds to the timing for calculating the basic fuel injection amount $Q_1$ or the reference fuel injection amount $Q_{1c}$ of any of the cylinders of the engine. In this embodiment, the calculation timing of the basic fuel injection amount $Q_1$ is set at a crank angle sufficiently (about 100 degrees) before the top dead centers of the compression strokes of the respective cylinders to facilitate the setting of the fuel injection circuit and the fuel injection valves. On the other hand, the reference fuel injection amount $Q_{1c}$ for obtaining MDL is calculated at a crank angle where the torque is actually generated by the fuel injected into the respective cylinders, for example, about 30 degrees crank angle after the top dead centers of the compression strokes of the respective cylinders.

Figure 7:
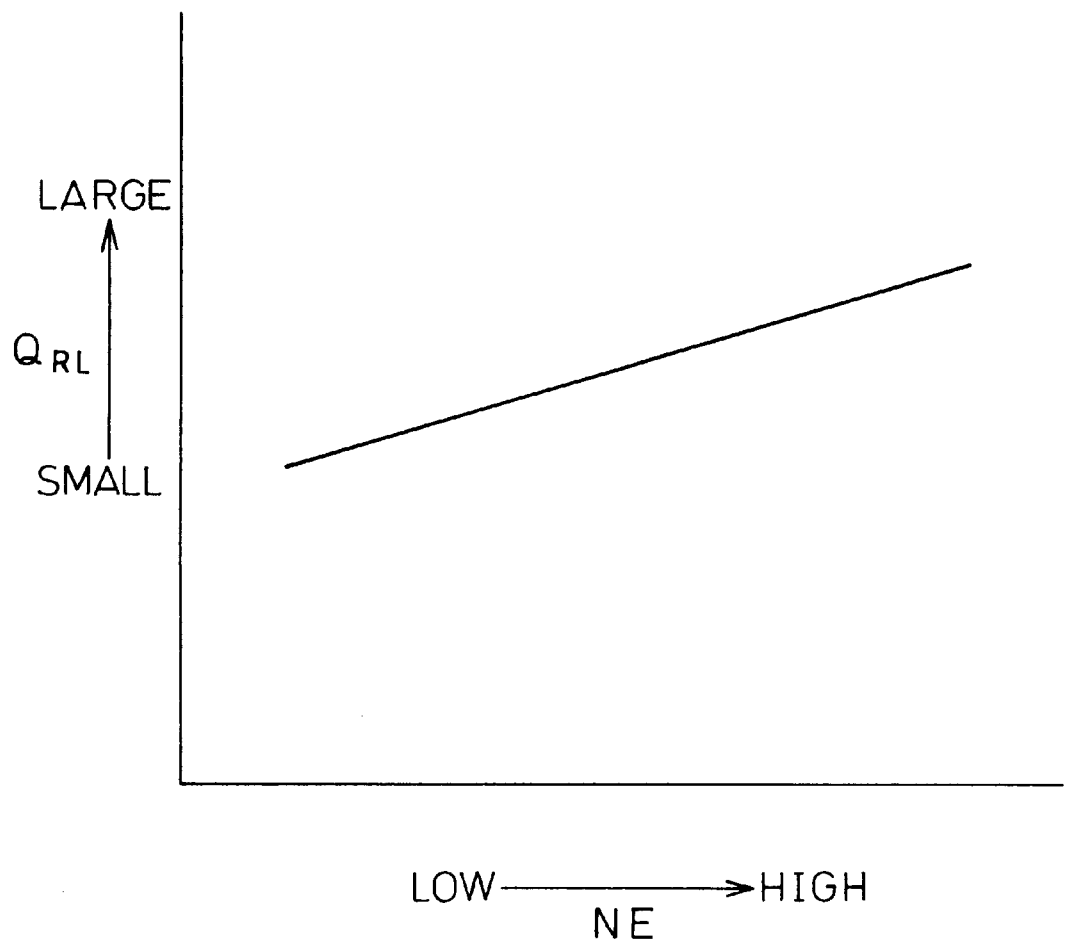
FIG. 7 is a diagram illustrating the relationship between the variables $Q_{RL}$ and NE.

If it is the time for calculating $Q_1$, at step 603, the value of a flag X is set to 0 at step 607 and, if it is the time for calculating $Q_1$ at step 605, the value of the flag X is set to 1 at step 609. If it is not the time for calculating $Q_{1c}$ and $Q_1$, the operation in FIG. 6 terminates immediately. Further, if it is the time for calculating $Q_1$, the zero-torque fuel injection amount $Q_{RL}$ is determined in accordance with the current engine speed NE using the relationship in FIG. 7. FIG. 7 shows the relationship between the values of $Q_{RL}$ and NE. As can be seen from FIG. 7, the value of $Q_{RL}$ in this embodiment changes in proportion to the value of NE.

Steps 613 through 617 are calculation steps common to both $Q_1$ and $Q_{1c}$, i.e., $Q_1$ and $Q_{1c}$ are calculated using the same calculation method. Namely, at step 613, the target fuel injection amount $Q_{GOV}$ is determined in accordance with the current engine speed NE and the current accelerator depression ACCP. The values of $Q_{GOV}$ are stored in the ROM of the ECU 30 in the form of a numerical table using NE and ACCP as parameters. Further, at step 615, the smoke limit fuel injection amount $Q_{FULL}$ is determined in accordance with the current engine speed NE and the current intake air amount G. In a diesel engine, if the target amount $Q_{GOV}$ of the fuel is injected into the engine without correction, the fuel injection amount largely increases before the amount of intake air actually drawn into the cylinders increases, for example, when the engine is accelerated from a low engine speed, and the exhaust smoke may be generated. The upper limit of the amount of fuel which can be injected into the cylinders is determined by the engine speed NE and the intake air amount G. Therefore, in this embodiment, the maximum amounts of fuel which can be injected into the cylinders without generating the exhaust smoke (i.e., the smoke limit fuel injection amount $Q_{FULL}$) are previously determined by experiment and stored in the ROM of the ECU 30 in the form of a numerical table using NE and G as parameters. A tentative value QF is set at the target fuel injection amount $Q_{GOV}$ or the smoke limit fuel injection amount $Q_{FULL}$ whichever is smaller at step 617.

At step 619, the operation determines whether the tentative value QF corresponds to $Q_1$ or $Q_{1c}$ based on the value of the flag X. If X=1, since this means that QF is calculated at the timing for calculating $Q_1$, the value of $Q_1$ is set to QF at step 623. If X=0 at step 619, the value of $Q_{1c}$ is set to QF at step 621. By performing the operation in FIG. 6, the values of $Q_1$, $Q_{1c}$ and $Q_{RL}$ used in the operation in FIG. 5 are determined.

Figure 8:
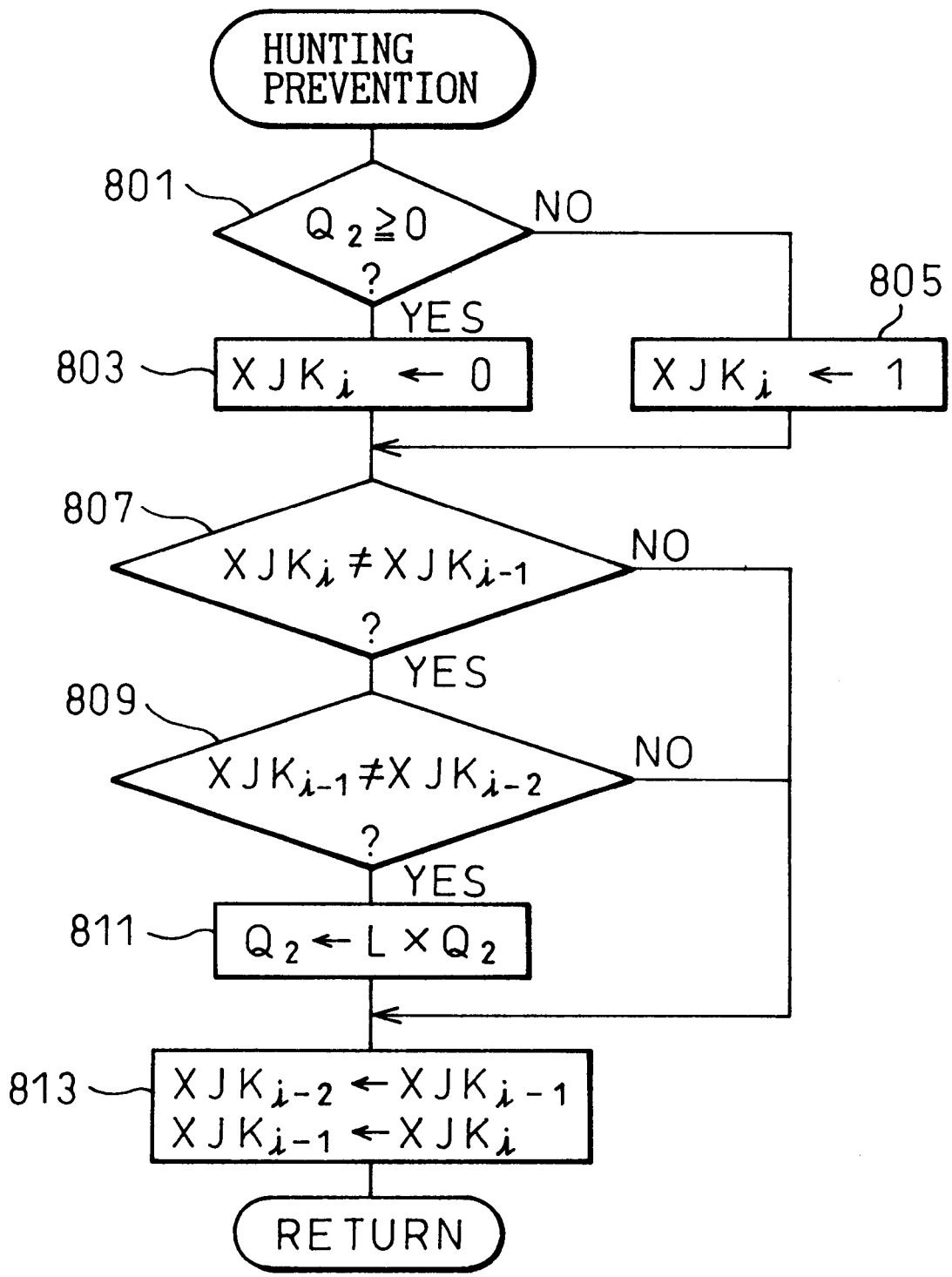
FIG. 8 is a flowchart illustrating the operation performed at step 525 in FIG. 5.

FIG. 8 is a flowchart explaining the operation performed at step 525 in FIG. 5 for preventing the hunting. In FIG. 8, the operation determines whether the correction amount $Q_2$ is a positive value. If $Q_2$ is positive, the operation sets the value of a flag $XJK_i$ to 0 at step 803 and, if $Q_2$ is negative, the value of the flag $XJK_i$ is set to 1 at step 805. Further, at steps 807 and 809 the operation determines whether the value of the flag $XJK_1$ is different from the values $XJK_{i-1}$ and $XJK_{i-2}$. $XJK_{i-1}$ and $XJK_{i-2}$ are the values of the flag $XJK_i$ when the operation in FIGS. 6 and 8 were last performed and performed two times before, respectively. If $XJK_i \neq XJK_{i-1}$ and $XJK_{i-1} \neq XJK_{i-2}$, this means that the reversal of the sign of $Q_2$ continued two times from the time the operation was performed two times before, and there is a possibility of hunting in the control. Therefore, in this case, the operation performs step 811 to reduce the absolute value of $Q_2$ by multiplying $Q_2$ by a constant L. The constant L is set at a value in the range $0 \leq L < 1$. Therefore, when hunting of the control is expected, the value of $Q_2$ is reduced (including the case where $Q_2$ is set to 0) and hunting does not occur.

After performing the above-explained steps, the operation renews the values $XJK_{i-1}$ and $XJK_{i-2}$ in order to prepare for next execution of the operation.

Next, the correction of the fuel injection amount based on the feedback control in this embodiment will be explained. As explained before, the torsional vibration of the output shaft system can be effectively attenuated by performing the feedforward control operation of FIGS. 2 through 8. However, in the actual vehicle, the characteristics of the elements composing the output shaft system varies within tolerances Further, the characteristics of the element may change during a long operation. If the characteristics of the elements differ from those used in the model of the output shaft system, it is difficult to attenuate the torsional vibration accurately only by the feedforward control in FIGS. 2 through 8. Therefore, in this embodiment a feedback control of the fuel injection amount based on the actual torsional vibration is performed in addition to the feedforward control in FIGS. 2 through 8.

Figure 9:
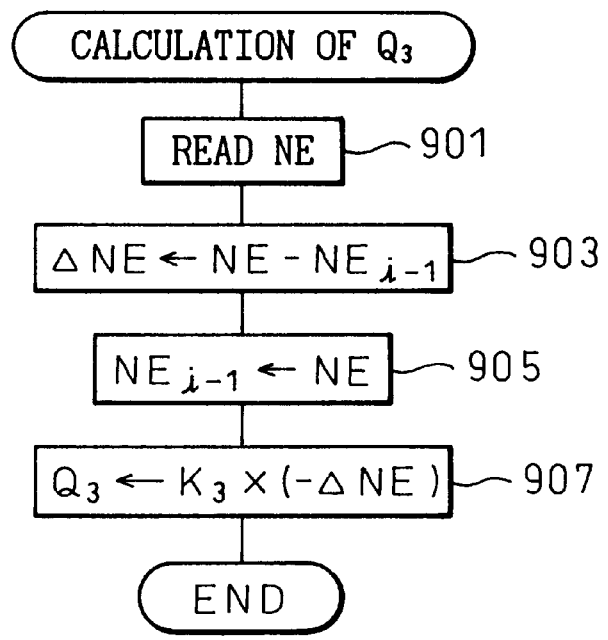
FIG. 9 is a flowchart illustrating the calculation of the correction amount of the fuel injection based on a feedback control.

FIG. 9 is a flowchart illustrating the feedback control of the present embodiment. This operation is performed by a routine executed by the ECU 30 at regular intervals. In this operation, the actual torsional vibration of the output shaft system (in FIG. 9, the rate of change in the engine speed NE) is detected and a second correction amount $Q_3$ of the fuel injection is calculated based on the detected actual torsional vibration in order to attenuate the torsional vibration.

In FIG. 9, at step 901, the current engine speed NE is read in and, at step 903, the amount of the change ΔNE in the engine speed from the time the operation in FIG. 9 was last performed is calculated by $\Delta NE = NE - NE_{i-1}$. The calculated ΔNE represents the rate of change in the engine speed and is used as the parameter representing S the torsional vibration of the output shaft system. After renewing the value of $NE_{i-1}$ at step 905, the operation calculates the second correction amount $Q_3$ at step 907 by $Q_3 = K_3 \times (-\Delta NE)$, wherein $K_3$ is a positive constant. Therefore, the value of $Q_3$ is set in accordance with the magnitude of the actual torsional vibration in such a manner that the torsional vibration is attenuated.

Figure 10:
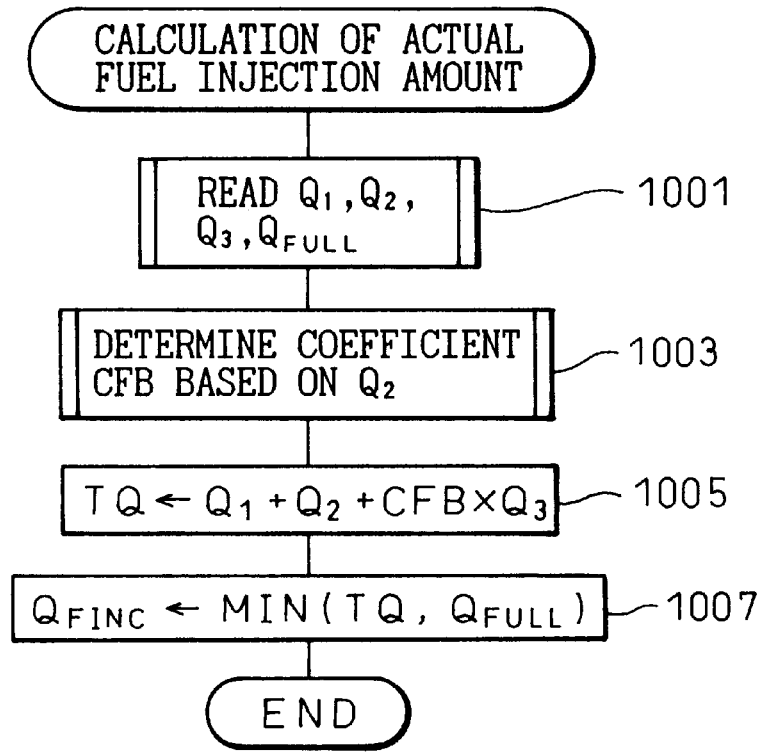
FIG. 10 is a flowchart illustrating the calculation of the fuel injection amount.

FIG. 10 is a flowchart illustrating the calculation of the actual (final) fuel injection amount $Q_{FINC}$. This operation is performed by a routine executed by the ECU 30 at the fuel injection amount calculation timing of the respective cylinders.

In FIG. 10, at step 1001, the values of the basic fuel injection amount $Q_1$, the second correction amount $Q_2$ based on the feedforward control, the correction amount $Q_3$ based on the feedback control and the smoke limit fuel injection amount $Q_{FULL}$, all calculated in the operations in FIGS. 5, 6, and 8 are read in. Further, a feedback sensitivity factor CFB is determined in accordance with the value $Q_2$ at step 1003. The feedback sensitivity factor CFB will be explained later.

At step 1005, the total fuel injection amount TQ is calculated by $TQ = Q_1 + Q_2 + CFB \times Q_3$. The actual fuel injection amount $Q_{FINC}$ is set to a value of the total fuel injection amount TQ or the smoke limit fuel injection amount $Q_{FULL}$ whichever is smaller at step 1007.

In this embodiment, $CFB \times Q_3$, instead of $Q_3$ itself, is used for calculating TQ so that the effect of the feedback control in FIG. 9 changes in accordance with the magnitude of $Q_2$. The value of CFB is set in accordance with the absolute value of $Q_2$.

FIG. 11 shows the relationship between the absolute value of the correction amount $Q_2$ (i.e., $|Q_2|$) based on the feedforward control and the value of the feedback sensitivity factor CFB. As can be seen from FIG. 11, the value of CFB is set at a smaller value as the absolute value $|Q_2|$ increases. Namely, the effect of the feedback control becomes smaller as the value $|Q_2|$ becomes larger.

If the value $|Q_2|$ is set at a large value, this means that the feedforward control is required to correct the fuel injection amount by a large amount in order to attenuate the torsional vibration (i.e., a large torsional vibration is expected). If feedback control is performed in this condition, the feedforward control and the feedback control may interfere with each other and the fuel injection amount may be corrected by the feedback control in the direction opposite to the correction by the feedforward control. If this kind of the interference occurs, the torsional vibration is not sufficiently attenuated. In this embodiment, since the value of CFB is set at a small value when the value $|Q_2|$ is large, the interference does not occur when the feedforward control intends to change the fuel injection amount largely to attenuate a large torsional vibration. On the other hand, when the value $|Q_2|$ becomes small, i.e., when the torsional vibration has been attenuated to some extent by the feedforward control, the value of CFB is set at a larger value to precisely attenuate the torsional vibration. Therefore, by setting the value of the feedback sensitive coefficient in the manner illustrated in FIG. 11, the interference of the feedback control with the feedforward control can be prevented and the torsional vibration can be attenuated efficiently.

In the above explanation, the present invention is described with reference to an embodiment in which a diesel engine is used. However, the application of the present invention is not limited to diesel engines. For example, the present invention can be applied to a gasoline engine equipped with fuel injection valves injecting fuel directly into the cylinders.

I claim:

1. A fuel injection control device for an internal combustion engine comprising:
    basic fuel injection amount setting means for setting a basic fuel injection amount of an engine in accordance with the operating condition of the engine; and
    correcting means for setting an actual fuel injection amount of the engine by correcting the basic fuel injection amount, wherein the correcting means estimates a torsional vibration of the output shaft system of the engine caused by the subsequent fuel injection based on the basic fuel injection amount and sets the actual fuel injection amount in accordance with the estimated torsional vibration in such a manner that the torsional vibration of the output shaft system is attenuated.

2. A fuel injection control device as set forth in claim 1, wherein the correcting means comprises first estimating means for estimating the value MDL of a parameter relating to the torsional vibration when the actual fuel injection amount of fuel is next injected to the engine and second estimating means for estimating the value TRG of the steady component of the parameter when the basic fuel injection amount of fuel is injected to the engine, wherein the steady component of the parameter is defined as the component obtained by eliminating fluctuation components from the parameter and wherein the correcting means calculates a correction amount of the fuel injection using a function based on the difference between the values TRG and MDL and obtains the actual fuel injection amount by adding the correction amount to the basic fuel injection amount.

3. A fuel injection control device as set forth in claim 2, wherein the correction means uses different functions of the difference between the values TRG and MDL for calculating the correction amount in accordance with whether the engine is accelerated or decelerated.

4. A fuel injection control device as set forth in claim 2, wherein the correcting means further adjusts the calculated correction amount when calculating the actual fuel injection amount in such a manner that the absolute value of the calculated correction amount is reduced if the calculated correction amount has successively changed between a positive value and a negative value more than a predetermined number of times.

5. A fuel injection control device as set forth in claim 2, wherein the correction means determines a zero-torque fuel injection amount which is a fuel injection amount when the engine output torque becomes plus and minus zero, and starts the calculation of the correction amount when the calculated basic fuel injection amount is increasing and becomes larger than the zero-torque fuel injection amount or when the calculated basic fuel injection amount is decreasing and becomes smaller than the zero-torque fuel injection amount.

6. A fuel injection control device as set forth in claim 2 further comprising a feedback control means for detecting the actual torsional vibration of the engine output shaft system and for setting a second correction amount of the fuel injection based on the detected actual torsional vibration in order to attenuate the actual torsional vibration, wherein the correction means calculates the actual fuel injection amount by adding the value obtained by multiplying the second correction amount by an adjustment factor to a sum of the basic fuel injection amount and the correction amount calculated based on the difference between the values of TRG and MDL and wherein the adjustment factor is set smaller as the correction amount calculated based on the difference between the values TRG and MDL becomes larger.

7. A fuel injection control device as set forth in claim 2, wherein the basic fuel injection amount setting means sets the basic fuel injection amount in accordance with the engine operating condition at a predetermined fuel injection amount setting timing and further sets a reference fuel injection amount in accordance with the engine operating condition at a timing where the fuel injected into the engine generates the output torque and wherein the correction means estimates the values TRG and MDL using the reference fuel injection amount.

* * * * *